(12) United States Patent
Koch et al.

(10) Patent No.: US 12,348,107 B2
(45) Date of Patent: Jul. 1, 2025

(54) ELECTRIC MOTOR

(71) Applicant: Brose Fahrzeugteile SE & Co. Kommanditgesellschaft, Würzburg, Würzburg (DE)

(72) Inventors: Kevin Koch, Fürth (DE); Michael Düncher, Würzburg (DE)

(73) Assignee: Brose Fahrzeugteile SE & Co. Kommanditgesellschaft, Würzburg, Würzburg (DE)

( * ) Notice: Subject to any disclaimer, the term of this patent is extended or adjusted under 35 U.S.C. 154(b) by 228 days.

(21) Appl. No.: 18/161,193

(22) Filed: Jan. 30, 2023

(65) Prior Publication Data

US 2023/0238853 A1 Jul. 27, 2023

Related U.S. Application Data

(63) Continuation of application No. PCT/EP2021/070907, filed on Jul. 26, 2021.

(30) Foreign Application Priority Data

Jul. 28, 2020 (DE) .................... 10 2020 209 499.3

(51) Int. Cl.
 *H02K 5/173* (2006.01)
 *F16C 25/08* (2006.01)
(52) U.S. Cl.
 CPC ......... *H02K 5/1732* (2013.01); *F16C 25/083* (2013.01); *F16C 2380/26* (2013.01)
(58) Field of Classification Search
 CPC . H02K 5/1732; F16C 25/083; F16C 2380/26; F16C 19/02; F16C 2229/00; F16C 2326/01
 See application file for complete search history.

(56) References Cited

U.S. PATENT DOCUMENTS

| 10,014,742 B2 | 7/2018 | Saum et al. |
| 2012/0045158 A1 | 2/2012 | Mashino et al. |
| 2014/0070648 A1 | 3/2014 | Winkler |

FOREIGN PATENT DOCUMENTS

| CN | 202713033 U | 1/2013 |
| DE | 3344249 A1 | 4/1985 |
| DE | 19804328 A1 | 8/1999 |

(Continued)

OTHER PUBLICATIONS

English translation of 10-2013-209202-A1 (Year: 2014).*
English translation of JP-S56-49414-A (Year: 1981).*
English translation of JP-S60-14616-A (Year: 1985).*

*Primary Examiner* — Tulsidas C Patel
*Assistant Examiner* — Joshua M Rodriguez
(74) *Attorney, Agent, or Firm* — Laurence A. Greenberg; Werner H. Stemer; Ralph E. Locher

(57) ABSTRACT

An electric motor has a stator and a rotor which is arranged on a motor shaft in a rotationally fixed manner. The motor shaft is rotatably mounted about a rotational axis in at least one rolling bearing within a motor housing. The rolling bearing is arranged in a bearing shield in a bearing receiving area, the outer ring of the rolling bearing is pretensioned by a spring disc which sits in the bearing receiving area in a fixed manner to the housing, and the spring disc has an opening and a number of spring elements raised axially towards the outer ring in a disc body surrounding the opening.

10 Claims, 5 Drawing Sheets

(56) References Cited

FOREIGN PATENT DOCUMENTS

| | | |
|---|---|---|
| DE | 102004044340 A1 | 3/2006 |
| DE | 102011090062 A1 | 11/2012 |
| DE | 102012210172 A1 | 12/2013 |
| DE | 102013209202 A1 | 11/2014 |
| DE | 102015213021 A1 | 1/2017 |
| JP | S5649414 A | 5/1981 |
| JP | S6014616 A | 1/1985 |

* cited by examiner

ELECTRIC MOTOR

SPECIFICATION

Field and Background of the Invention

The invention relates to an electric motor with a stator and with a rotor, which is arranged for conjoint rotation on a motor shaft, which is mounted rotatably about an axis of rotation within a motor housing. An electric motor is understood here in particular to be an electronically commutated steering motor of a motor vehicle.

Motor vehicles usually have a number of adjustment parts, for example a steering system, a seat adjustment system, an operable lock, a window lifter and an adjustable sunroof, which can be adjusted or moved between different adjustment positions by means of, in each case, an associated electric motor drive (actuator or adjustment drive). In particular, a steering motor of a motor vehicle is usually a brushless electric motor as a three-phase electric machine.

Such an electric motor usually has a stator with a number of stator teeth arranged, for example, in a star shape, which carry an electric rotating-field or stator winding in the form of individual coils which are in turn wound from an insulating wire. The coils are assigned with their coil ends (winding wire ends) to individual strings or phases and are interconnected with each other in a predetermined manner as well as guided to phase terminals for energizing the rotating-field winding. In the case of a three-phase, electronically commutated electric motor, the stator has three phases and thus at least three phase conductors or phase windings, each of which is supplied, phase-shifted, with electric current in order to generate a rotating magnetic field in which a rotor, usually provided with permanent magnets, rotates. The phase ends of the phase windings are fed to motor electronics to control the electric motor. The coils of the rotating field winding are connected here in a star or delta configuration and are electrically contacted with the three phase terminals.

The rotor is seated for conjoint rotation (shaft-fixed) on a motor shaft (rotor shaft), which is rotatably mounted in at least one bearing, in particular in a rolling or ball bearing. The bearing is accommodated in a bearing receptacle (bearing seat) of a bearing shield, which can be integrally formed on the motor housing, for example as a so-called B-side bearing shield. On this housing side of the B-side bearing shield, an axial housing collar of the, for example, pot-like motor housing can form a receiving space for a rotary encoder and/or for control electronics of the electric motor.

A further ball bearing for rotatable mounting of the motor shaft can be attached to an A-side bearing shield closing the motor housing or arranged in a bearing receptacle there. On the housing side of the A-side bearing shield, the electric motor can be coupled (connected) via its motor shaft by means of a transmission to a steering rod of a vehicle steering system.

In the case of a ball bearing (rolling bearing), which typically has a shaft-fixed inner ring (ball bearing inner ring) and an outer ring (ball bearing outer ring), bearing compensation washers are often provided for axially securing, adjusting or preloading the ball bearing in the bearing seat in order to achieve the most play-free running of the motor shaft possible and a reduction in running noise. For this purpose, so-called wave spring washers and/or clamping washers can be used to compensate for axial tolerances between housing parts and the bearing seat of the motor shaft, i.e. to axially adjust or preload the ball bearing and eliminate bearing play (a bearing clearance) between the ball bearing rings. By means of a wave spring washer, for example, the ball bearing outer ring and the ball bearing inner ring can be shifted relative to each other. If the wave spring washer is not supported at the bottom of a bearing receptacle or in the bearing seat, but rests against the ball bearing on the opposite side thereof, for example, a clamping washer is typically required to hold the wave spring washer in the desired position on the motor shaft.

SUMMARY OF THE INVENTION

The object of the invention is to describe an electric motor which is as quiet as possible in motor operation, in particular an electronically commutated internal rotor motor.

This object is achieved in accordance with the invention by the features as claimed. Advantageous embodiments and developments are the subject of the dependent claims.

The electric motor has a stator and a rotor, which is arranged shaft-fixed on a motor shaft, which is mounted in at least one rolling bearing, preferably in a ball bearing, with an outer ring and with an inner ring, which is shaft-fixed with the motor shaft, within a motor housing so as to be rotatable about an axis of rotation. The rolling bearing or ball bearing is arranged in a bearing shield, also referred to below as a housing bearing shield, in an axially recessed bearing receptacle having a through-opening for the motor shaft. The outer ring of the rolling bearing is preloaded by means of a spring washer, which is seated, housing-fixed, in the bearing receptacle on the bearing side of the housing bearing shield facing away from the rotor. The spring washer, which is preferably a stamped and bent part made of a metal sheet, has an opening (pull-through opening), preferably embodied as a pull-through, for the motor shaft and, in a washer body surrounding this opening, a number of spring elements projecting axially towards the outer ring. The electric motor is preferably an electronically commutated internal rotor motor, in particular a steering motor of a motor vehicle.

The bearing holder for the ball bearing (rolling bearing) is advantageously embodied as a sliding fit. This means that when the electric motor is installed, its motor shaft can be inserted into the motor housing together with the rotor and with the ball bearing (rolling bearing) already installed, and the ball bearing (rolling bearing) can be inserted into the bearing receptacle from the bearing side of the housing bearing shield facing the housing interior.

The ball bearing (rolling bearing) preloaded by means of the spring washer is suitably located in the so-called B-side bearing shield. There, a receiving space for motor electronics for controlling the electric motor is expediently formed in that the preferably cylindrical housing wall of the motor housing projects axially beyond the bearing shield there. Through-openings are suitably provided in this housing bearing shield for phase terminals (contacts) connected to the stator winding, which project into the receiving space and are electrically contacted or can be contacted there with the motor electronics.

On the opposite end face of the motor housing, a further bearing shield with a bearing receptacle for a further bearing, in particular for a rolling or ball bearing, is suitably provided. This bearing receptacle of the so-called A-side bearing shield is expediently not embodied as a sliding fit, but with a receptacle base on which the bearing (rolling or ball bearing) is supported. In this A-side bearing, the outer ring of the ball bearing (rolling bearing) is inserted as an interference fit into the bearing receptacle. Thus, this A-side bearing shield can also be mounted—as a housing cover so to speak—together with the motor shaft and the rotor as well as the B-side ball bearing (rolling bearing).

The (central) opening of the spring washer, which is preferably formed as a pull-through, is embodied as a shaft bushing with an axially projecting (bent-up) opening edge. This ensures good axial spring stiffness of the spring washer even with a circular pull-through opening. To further increase the spring stiffness, the pull-through opening is suitably non-circular, wherein the pull-through opening is designed as an internal polygon or preferably as an internal multi-round.

Particularly preferably, the pull-through opening of the spring washer is designed as an internal triangle. In other words, the pull-through opening, i.e. the washer pull-through, has the basic shape of a triangle, but with rounded (rounded off or rounded out) inner corners. The opening of the spring washer can also have the shape of, for example, a double triangle (with triangular openings rotated 180° relative to each other) or the shape of a pentagon.

In an expedient embodiment, the spring elements of the spring washer are bent up on the free-end side to form a leg portion that rests against the outer ring of the rolling bearing. In other words, the particular spring element has a fixed end connected to the washer body and a loose end which itself has no direct connection to the washer body. Suitably, the spring elements of the spring washer are arranged equidistantly in the circumferential direction of the washer body surrounding the (pull-through) opening, i.e. with the same circular line or arc length between adjacent spring elements. The number of spring elements of the spring washer is less than or equal to six, preferably three.

A particularly advantageous embodiment provides for the outer edge of the spring washer to be projected axially. This allows the spring washer to be pressed particularly reliably into the bearing receptacle in order to fix the spring washer particularly securely in the bearing receptacle and thus in the motor housing and to keep it fixed to the housing. The opening edge of the pull-through opening and the outer edge of the spring washer expediently project in the same axial direction.

In addition, the spring elements of the spring washer are advantageously projected (bent out) in the axial direction opposite the axially projected outer and opening edge of the washer. On the one hand, the spring washer is thus held securely, fixed to the housing, and, on the other hand, the spring washer can be brought with its spring legs as close as possible to the outer ring of the ball bearing (rolling bearing), thus saving space. In addition, the installation of the spring washer is simplified because the particular edge bend is preferably oriented counter to the direction of insertion of the spring washer into the bearing receptacle.

BRIEF DESCRIPTION OF THE FIGURES

In the following, exemplary embodiments of the invention are explained in greater detail with reference to a drawing, in which.

Corresponding parts and sizes are provided with the same reference signs in all figures.

DETAILED DESCRIPTION OF THE INVENTION

Figure 1:
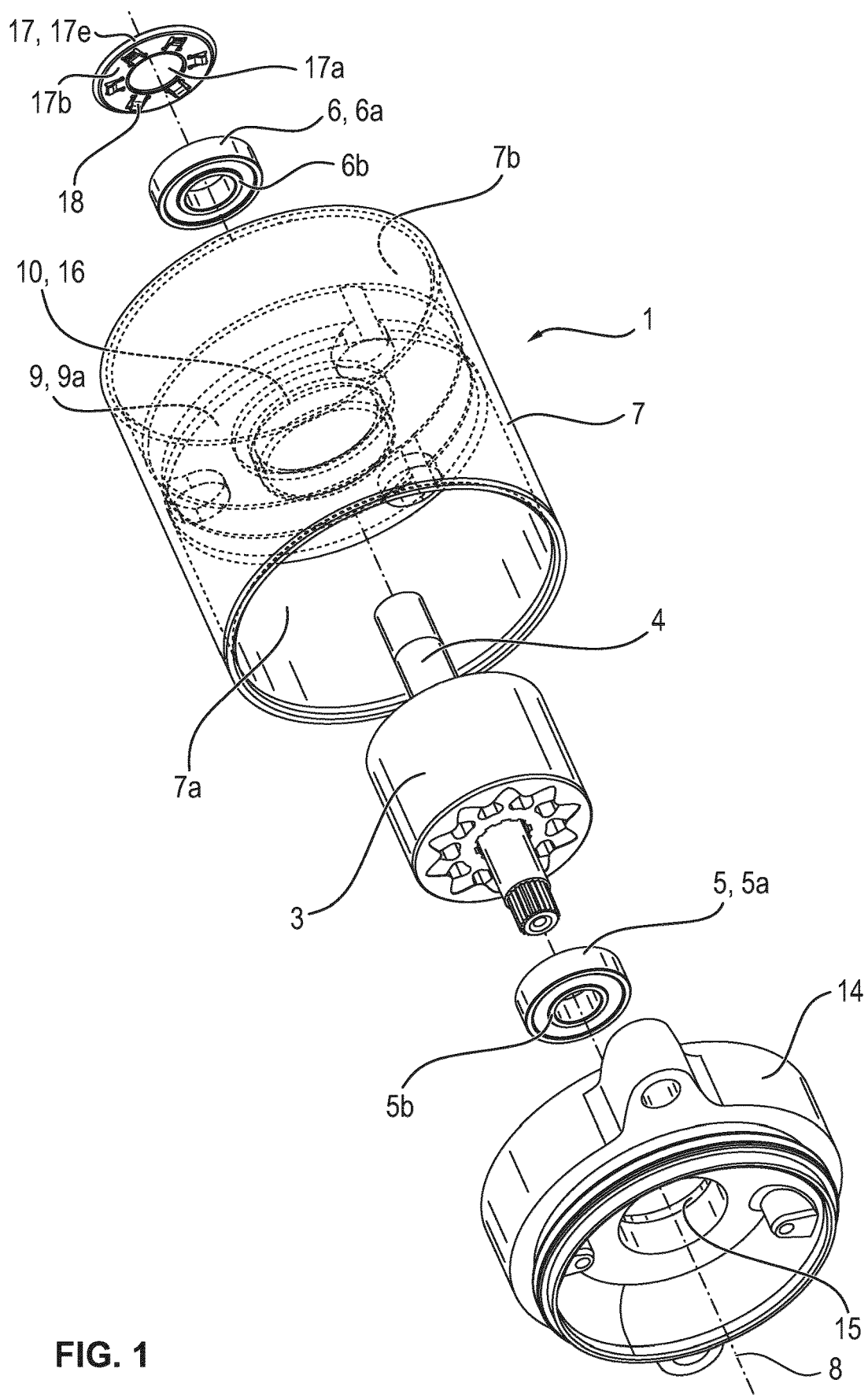
FIG. 1 shows an exploded view of an electric motor of a motor vehicle with a motor housing with inserted and removed bearing shield and with a rotor on a motor shaft and with A- and B-side ball bearings and with a one-piece spring washer for clamping the outer ring of the B-side ball bearing.
Figure 2:
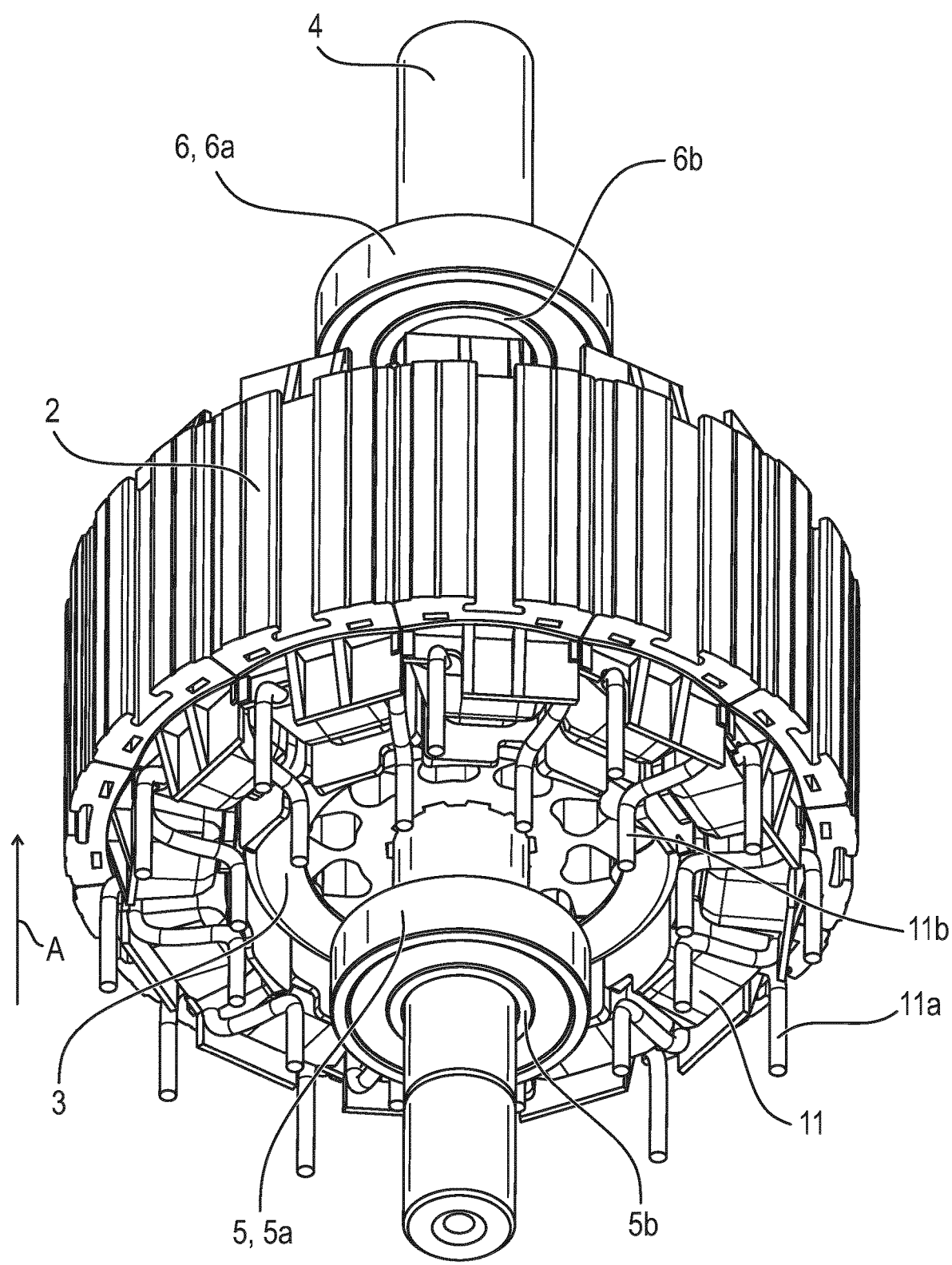
FIG. 2 shows a perspective view of the electric motor without motor housing and without bearing shields and with a stator.

FIGS. 1 and 2 show primarily important parts of the electric motor 1, which is an electronically commutated internal rotor motor, and which is preferably used as a steering motor of a motor vehicle. The electric motor 1 has a stator 2 (FIG. 2) and a rotor 3, which is arranged shaft-fixed on a motor shaft 4. This is mounted in an A-side ball bearing 5 and in a B-side ball bearing 6 within a motor housing 7 so as to be rotatable about an axis of rotation (motor axis) 8. A B-side bearing shield (housing bearing shield) 9 with a bearing receptacle 10 for the ball bearing 6 is inserted into the cylinder-shaped (cylindrical) motor housing 7. The B-side bearing shield 9 forms an intermediate wall between a motor compartment 7a, in which the rotor 3 with the motor shaft 4 accommodated in the ball bearings 5, 6 and the stator 2 are arranged, and a receiving space 7b for electronics, not shown, for controlling the electric motor 1.

The stator 2 has a number of stator teeth, which are arranged in a star shape and which carry coils 11. The coils 11 are associated by their coil ends (winding wire ends) 11a, 11 b with individual strings or phases and are connected to one another in a star or delta connection by means of a circuit ring, not shown, and are led to phase terminals 12 for energizing the rotating-field winding. In the case of the three-phase, electronically commutated electric motor 1, the stator 2 has three phases and thus at least three phase windings, each of which is supplied, phase-shifted, with electric current. These generate a rotating magnetic field in which the rotor 3, which is provided with permanent magnets, rotates about the axis of rotation 8.

Figure 3:
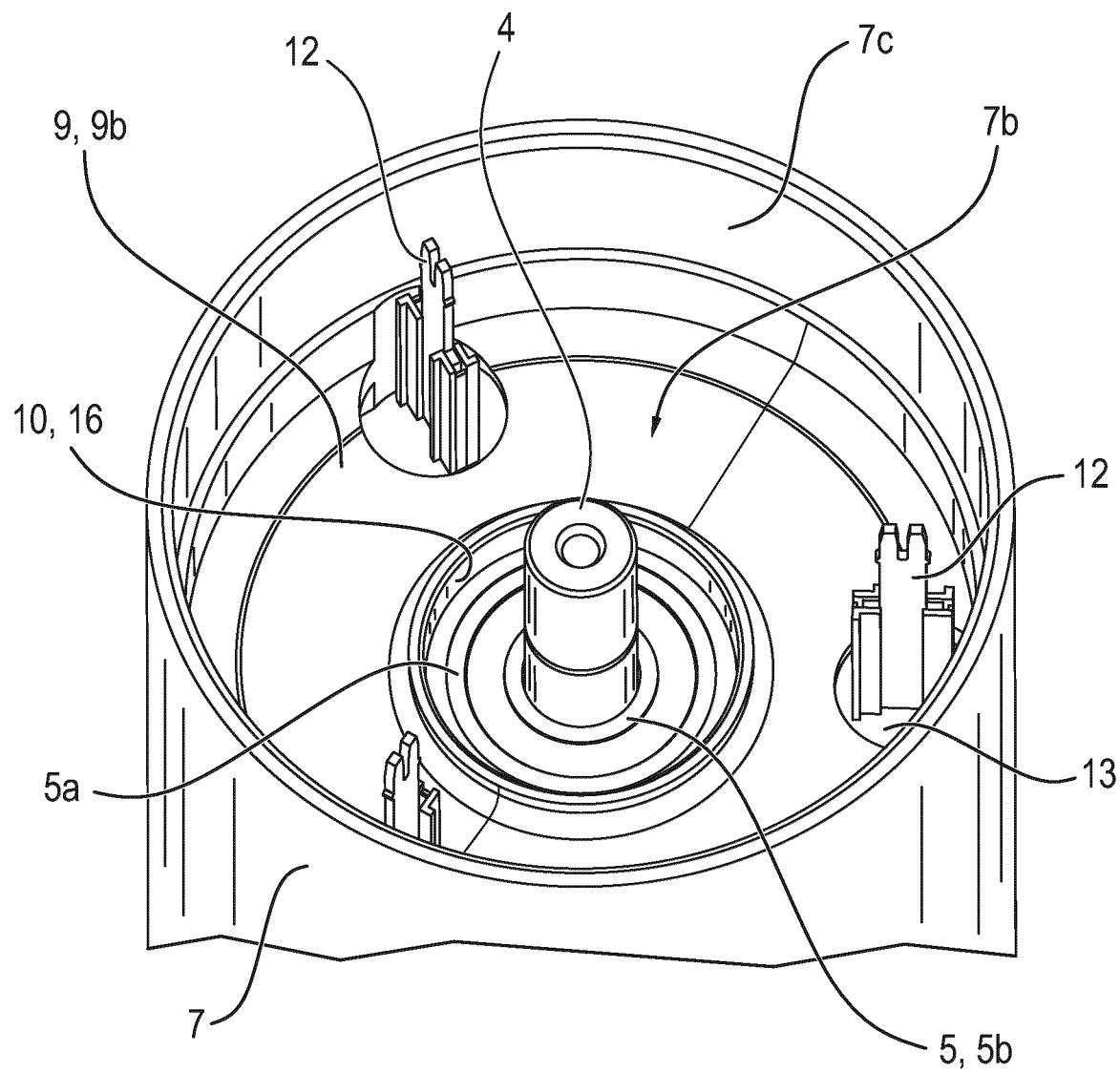
FIG. 3 shows a perspective view of a detail of the electric motor looking at the B-side ball bearing without spring washer.
Figure 4:
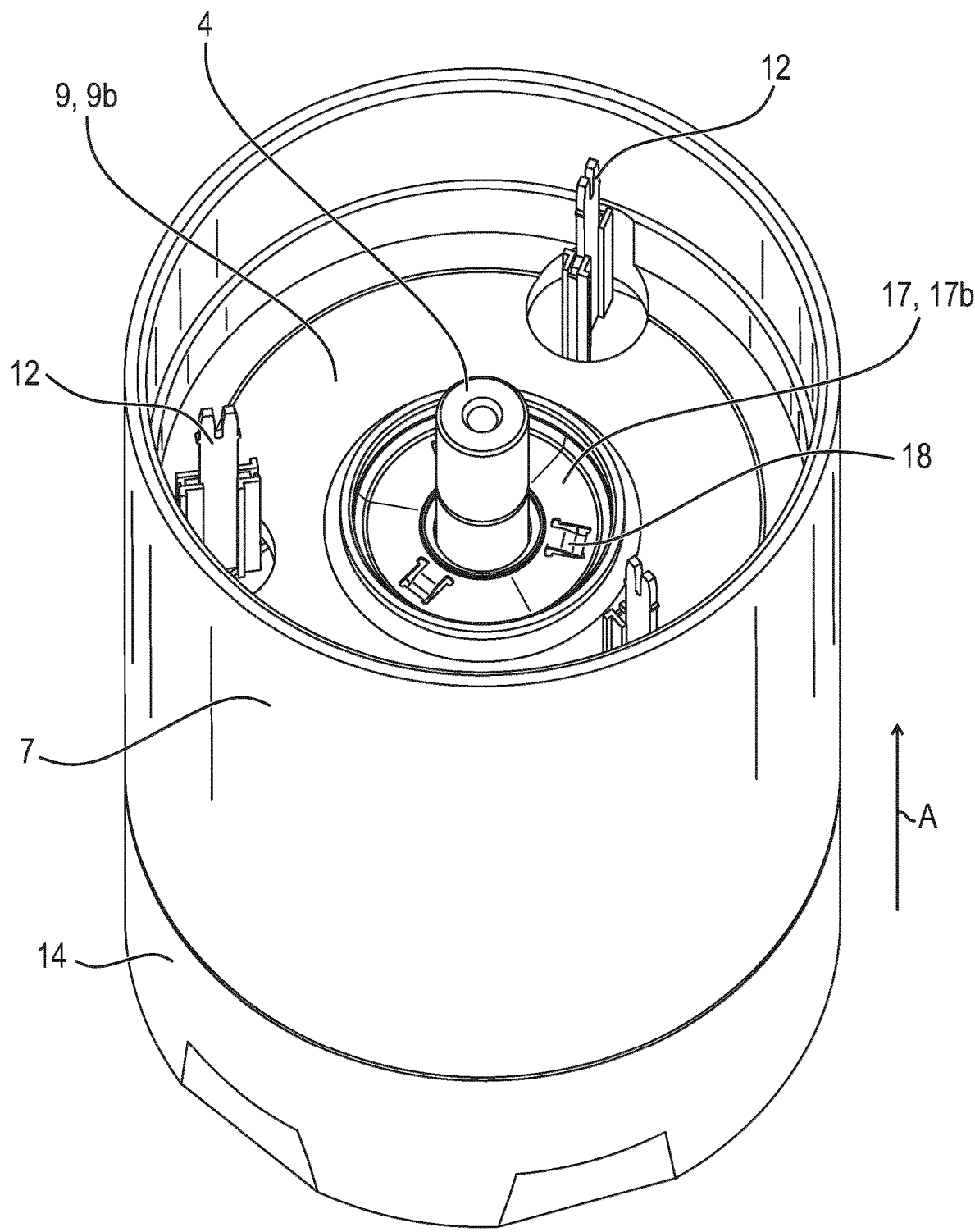
FIG. 4 shows a representation according to FIG. 3 with a view of the inserted spring washer.

As can be seen from FIGS. 3 and 4, the three phase contacts or terminals 12, which are connected to the stator coils 11 interconnected to form a stator winding and are contacted with the motor electronics, project into the receiving space 7b provided for the motor electronics, which is surrounded by a cylindrical housing portion 7c of the motor housing 7 axially projecting beyond the bearing shield 9 there, via openings 13 in the bearing shield 9.

An A-side bearing shield 14 with a bearing seat 15 for the ball bearing 5 forms a housing cover with which the motor housing 7 is closed. The outer ring 5a of the ball bearing 5 is pressed into the bearing seat 15 so as to be fixed to the housing, while the inner ring 5b of the ball bearing 5 is pressed onto the motor shaft 4 so as to be fixed to the shaft. This bearing seat 15 as bearing receptacle of the A-side bearing shield 14 for the ball bearing 5 there is not embodied as a sliding fit, but as an interference fit for the outer ring 5a of the ball bearing 5. Thus, this A-side bearing shield 14 can also be installed as a housing cover together with the motor shaft 4 and the rotor 3 as well as with the B-side ball bearing 6 in or on the motor housing 7. On the housing side of the A-side bearing shield 14, the electric motor 1 can be coupled via its motor shaft 4 by means of a transmission to a steering rod of a vehicle steering system.

The axially retracted bearing receptacle 10 of the B-side bearing shield 9 for the ball bearing 6, which has a through-opening 16 for the motor shaft 4, is embodied as a sliding fit. This means that, although the inner ring 6b of the ball bearing 6 is 22 in turn pressed onto the motor shaft 4 in a shaft-fixed manner, the outer ring 6a of this ball bearing 6 merely lies in the bearing receptacle 10 (as a loose fit). As a result, when the electric motor 1 is installed, its motor shaft 4 can be inserted together with the shaft-fixed rotor 3 and with ball bearings 5, 6 already installed in a shaft-fixed manner into the motor housing 7 with the stator 2 likewise already accommodated therein. The shaft-fixed ball bearing 6 is inserted here into the bearing receptacle 10 from the bearing side 9a of the bearing shield 9 facing the motor compartment (housing interior) 7a.

In the installed state of the electric motor 1 shown in FIG. 4, the outer ring 6a of the ball bearing 6 is preloaded by means of a spring washer 17, which is seated on the bearing side 9b of the bearing shield 9 facing away from the rotor 3 and the motor compartment 7a within the receiving space 7b for the motor electronics in the bearing receptacle 10 so as to be fixed to the housing.

The spring washer 17 is preferably a stamped and bent part made of a metal sheet. The spring washer 17 has an opening 17a embodied as a pull-through for the motor shaft 4 and a washer body 17b surrounding this opening (pull-through opening) 17a. The washer body has a number of axially projected spring elements or spring legs 18 equal to six according to FIG. 1 and equal to three according to FIGS. 4 and 5. In the installed state, when the spring washer 17 is pressed into the bearing receptacle 10 under spring preloading of its spring elements 18, the spring elements 18 lie resiliently against the outer ring 6a of the ball bearing 6, so that the outer ring 6a is axially preloaded.

The (central) opening 17a, as shaft lead-through, of the spring washer 17 is embodied as a pull-through, i.e., with axially projected (bent-up) opening edge 17c. This ensures good axial spring stiffness of the spring washer 17 even with a circular pull-through opening 17a. To further increase the spring stiffness, the pull-through opening 17a is preferably formed as an internal multi-round in the shape of a triangle with rounded (rounded off or rounded out) inner corners 17d (FIG. 5).

Figure 5:
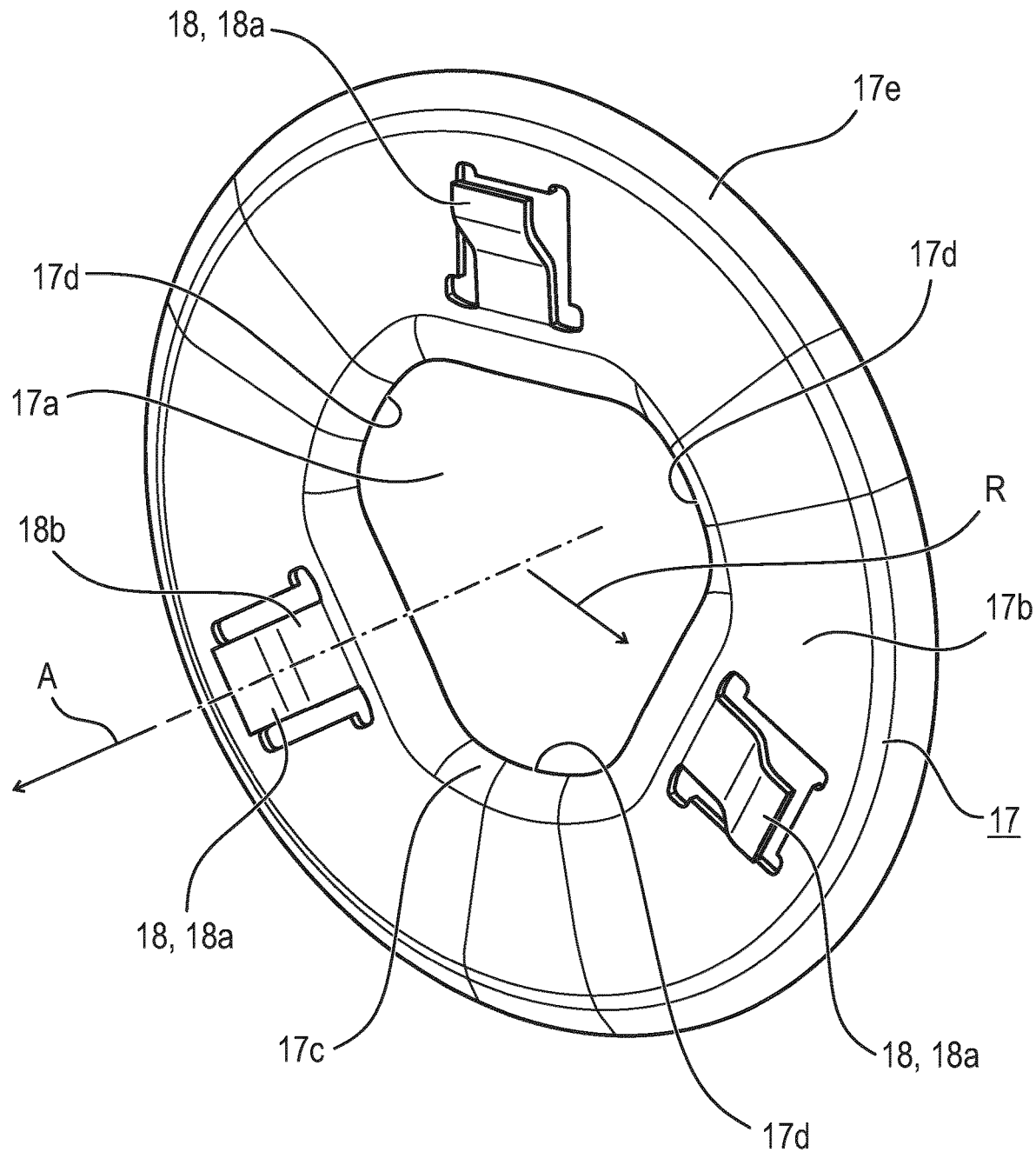
FIG. 5 shows a perspective view of a variant of the spring washer with an inner tri-round pull-through (pull-through opening) for the motor shaft and three spring elements bent up axially from a washer body.

As can be seen from FIG. 5, the spring elements 18 of the spring washer 17 are bent up at the free end to form a leg portion 18a, which rests against the outer ring 6a of the ball bearing 6 as the loose end of the particular spring element 18. The spring elements 18 of the spring washer 17 are arranged at equal distances from one another in the circumferential direction of the washer body 17b surrounding the pull-through opening 17a, that is to say with circular lines (circular arcs) of equal length. The spring elements 18 are bent up axially out of the plane of the washer body 17b.

The outer edge 17e of the spring washer 17 is projected axially—that is to say in the axial direction A. This allows the spring washer 17 to be pressed reliably into the bearing receptacle 10 so that the spring washer 17 is securely fixed in the bearing receptacle 10 and held in a manner fixed to the housing. The outer edge 17e and the opening edge 17c of the pull-through opening 17a of the spring washer 17 project in the same axial direction A.

The spring elements 18 of the spring washer 17, which are punched out of its washer body 17b, are projected (bent out) in the axial direction A opposite the axially projected opening and washer outer edge 17c, 17e. The spring elements 18 of the spring washer 17 are formed with their spring end 18b facing away from the leg portion 18a as a fixed end on the washer body 17b and run or extend radially on the free-end side, that is to say in the radial direction R. Due to the described geometry or design of the spring washer 17, it is securely held, fixed to the housing, and can be brought up to the outer ring 6a of the ball bearing 6 with its spring legs 18 in a space-saving manner and can be installed easily and reliably.

In summary, the invention relates to an electric motor 1 having a rotor 3 which is arranged in a rotationally fixed (shaft-fixed) manner on a motor shaft 4 which is installed in at least one ball bearing (rolling bearing) 6 within a motor housing 7 so as to be rotatable about an axis of rotation 8, wherein the ball bearing 6 is arranged in a bearing shield 9 in a bearing receptacle 10, wherein the outer ring 6a of the ball bearing 6 is preloaded by means of a spring washer 17 which is seated, housing-fixed, in the bearing receptacle 10 and has an opening 17a and, in a washer body 17b surrounding said opening, a number of spring elements 18 projecting axially towards the outer ring 6a.

The claimed invention is not limited to the exemplary embodiments described above. Rather, other variants of the invention may also be derived therefrom by a person skilled in the art within the scope of the disclosed claims without departing from the subject matter of the claimed invention. Furthermore, in particular, all individual features described in conjunction with the various exemplary embodiments can also be combined in other ways within the scope of the disclosed claims without departing from the subject matter of the claimed invention.

For example, the pull-through opening of the spring washer can also have the shape of a double triangle, with triangles rotated through 180° relative to each other, or a pentagon. Furthermore, the ball bearings can also be embodied as rolling bearings with a rolling element shape that deviates from the spherical shape, for example a cylindrical shape of the rolling elements arranged between the inner and outer ring.

In addition, the solution described can be used not only in the specifically presented application, but also in similar embodiments in other motor vehicle applications, such as door and tailgate systems, window lifters, vehicle locks, adjustable seat and interior systems, and in other electric drives and their arrangement in the vehicle.

LIST OF REFERENCE SIGNS 1 electric motor
2 stator
3 rotor
4 motor shaft
5 (A-side) ball bearing
5a outer ring
5b inner ring
6 (B-side) ball bearing
6a outer ring
6b inner ring
7 motor housing
7a motor compartment
7b electronics receiving space
7c housing portion
8 axis of rotation
9 (B-side) bearing shield
9a, 9b bearing side
10 bearing receptacle
11 coil 11a, 11b coil end
1 phase terminal/contact
13 opening
14 (A-side) bearing shield
15 bearing seat
16 through-opening
17 spring washer
17a pull-through/pull-through opening
17b washer body
17c opening edge
17d inner corners
17e washer outer edge
18 spring element/leg
18a leg portion
18b spring end
A axial direction
R radial direction

The invention claimed is:

1. An electric motor, comprising:
a stator, a rotor mounted for conjoint rotation on a motor shaft, and at least one rolling bearing supporting said motor shaft within a motor housing for rotation about an axis of rotation;
said rolling bearing having an inner ring affixed to said motor shaft and an outer ring;
said rolling bearing being disposed in a bearing shield in an axially recessed bearing receptacle that is formed with a through-opening for said motor shaft;
a spring washer disposed to preload said outer ring of said rolling bearing, said spring washer being seated, housing-fixed, in said bearing receptacle on a bearing side of said bearing shield facing away from said rotor; and
said spring washer being a substantially planar washer body formed with an opening, embodied as a pull-through, for said motor shaft, with said substantially planar washer body surrounding said opening having a number of spring elements projecting radially outward, away from said opening and axially towards said outer ring; and
said opening of said spring washer being formed as an internal triangle with rounded corners.

2. The electric motor according to claim 1, wherein said spring elements of said spring washer are bent up on a free-end side to form a leg portion that rests against said outer ring of said rolling bearing.

3. The electric motor according to claim 1, wherein said spring elements of said spring washer are arranged equidistantly in a circumferential direction of said washer body surrounding said opening.

4. The electric motor according to claim 1, wherein a number of said spring elements of said spring washer is less than or equal to six.

5. The electric motor according to claim 4, wherein a number of said spring elements of said spring washer is three.

6. The electric motor according to claim 1, wherein an outer edge of said spring washer projects axially.

7. The electric motor according to claim 6, wherein an opening edge of said opening that is embodied as a pull-through and said outer edge of said spring washer project in the same axial direction.

8. The electric motor according to claim 1, wherein an opening edge of said opening that is embodied as a pull-through and an outer edge of said spring washer project in the same axial direction.

9. The electric motor according to claim 1, wherein said spring elements of said spring washer project in an axial direction opposite an axially projecting outer edge of said washer and opposite said axially projecting opening edge of said opening.

10. The electric motor according to claim 1, wherein said spring washer is a stamped and bent part.

* * * * *